Oct. 7, 1941.  W. F. ENGEL  2,258,111
PREPARATION OF CATALYSTS
Filed Oct. 9, 1939
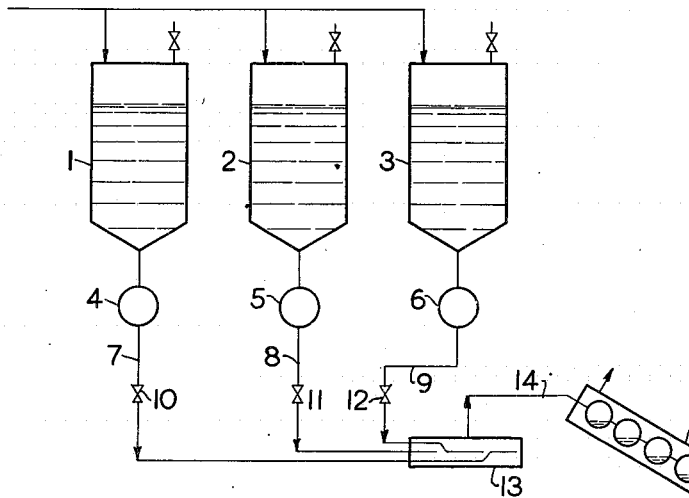
Fig. I
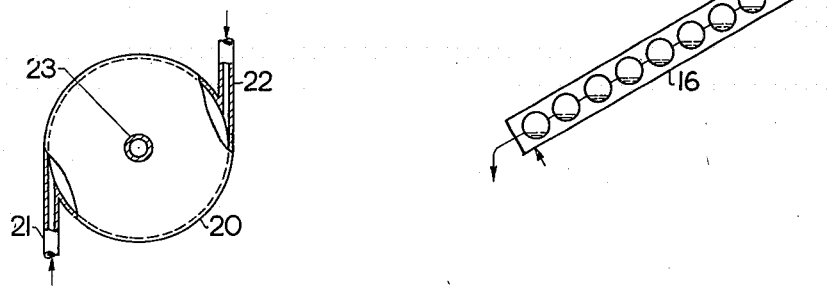
Fig. II
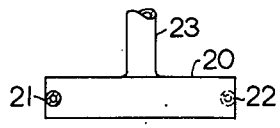
Fig. III
Inventor: Willem Frederik Engel
By his Attorney: *Arthur B Bakalar*

Patented Oct. 7, 1941

2,258,111

UNITED STATES PATENT OFFICE 2,258,111

PREPARATION OF CATALYSTS

Willem Frederik Engel, Amsterdam, Netherlands, assignor to Shell Development Company, San Francisco, Calif., a corporation of Delaware Application October 9, 1939, Serial No. 298,613
In the Netherlands October 18, 1938

5 Claims. (Cl. 252—254)

The present invention relates to the preparation of catalytic agents containing metal oxides as active ingredients.

As is well known, many of the metal oxides possess valuable catalytic properties and find widespread application for the catalyzation of many organic and inorganic reactions. While the catalytic properties of metal oxides are often referred to as if they were definite characteristic properties of the materials like the index of refraction, specific gravity, molecular weight, etc., they are, in fact, dependent to a great extent upon such factors as the surface structure, the amount of available surface, the presence or absence of minute amounts of promoting or poisoning materials, etc., and vary greatly depending upon the mode of preparation. Although some metal oxides may be prepared in a catalytically active form by various different procedures, the best catalysts are usually prepared by chemical precipitation. In order to avoid local concentrations in the precipitation, it is the practice to introduce the added reagent very slowly in small portions while stirring. Thus, the conventional practice consists essentially in precipitating the desired oxides, hydroxides, carbonates, or the like, by the slow addition of suitable reagents to solutions of suitable metal compounds, or vice versa, separating the precipitate, washing and drying, and subjecting the product to such further working up as is appropriate for the case at hand. While this general procedure, which corresponds closely in many respects to that used in analytical work, is easily executed, easily reproduced, and often yields excellent catalysts, it contains certain inherent defects which have perhaps not been given sufficient consideration.

In the conventional method for the preparation of the various metal oxide catalysts, the precipitate obtained is not all formed under the same conditions. Thus, at the beginning of the precipitation the precipitate formed is present in a solution containing a large amount of one of the reactants and usually adsorbs and occludes considerable quantities of this reactant. Near the end of the precipitation, the precipitate formed is present in a solution which is practically devoid of this reactant but contains considerable quantities of soluble reaction products and usually also an excess of the added reagent. The precipitates formed at the beginning of the precipitation and near the end of the precipitation, therefore, often have appreciably different compositions. Furthermore, since the precipitation in conventional practice is carried out at elevated temperatures, the precipitate formed at the beginning of the precipitation is heated in the solution for a longer time than that formed near the end of the precipitation and is, therefore, allowed considerably more opportunity to undergo secondary reactions and physical changes such as peptization, etc. Consequently, the metal oxides produced according to the conventional methods are usually in reality a mixture of materials of different composition and physical structure and, oftentimes, different catalytic properties. These inherent defects in the conventional method of preparing these catalysts are, of course, much more pronounced in the commercial production of large quantities of material than in the preparation of small quantities in the laboratory. In laboratory preparations the precipitation may be completed in a relatively short time, for instance, in about 5 to 60 minutes. In the practical production of large quantities of catalysts for commercial application, however, the time required for the precipitation by conventional methods is considerably longer.

I have found that the above-mentioned defects are substantially eliminated and that superior and more desirable catalysts may be prepared if the time at which the freshly formed precipitate is subjected to elevated temperatures is made uniform and very short, i. e., appreciably shorter than customarily allowed in the laboratory preparation of even small quantities of catalyst and very much shorter than allowed in commercial practice. The present invention provides a process whereby this may be easily accomplished in an entirely practical and economical manner, and superior catalysts may be prepared absolutely uniform in any desired quantity.

The desired metal hydroxide or mixture of metal hydroxides, according to the process of the present invention, is all precipitated under a uniform condition and is all heated to the desired temperature for a uniform and controlled short period of time most favorable for the production of the most active and otherwise satisfactory catalyst. The metal hydroxide or mixture of two or more metal hydroxides is precipitated by intimately contacting the reagents in the desired proportions and in small amounts. This is preferably done by continuously introducing the reagents at suitably controlled rates into a comparatively small reaction space wherein they are intimately mixed and allowed to react. The reaction mixture is then promptly subjected to a very short heat treatment at a temperature and for a time most favorable for the development of the desired structure and character of the precipitate.

The precipitation may be conveniently executed, according to the process of the present invention, in an assembly of apparatus such as illustrated diagrammatically in Figure I of the attached drawing. Referring to Figure I, 1, 2, and 3 represent suitable storage vessels for the solutions of metal compounds and such other reagents as are to be used. The storage vessels communicate with a reaction vessel 13 by means of conduits 7, 8, and 9, preferably provided with flow measuring means 4, 5, and 6 and flow regulating means such as valves 10, 11, and 12. Numerals 15 and 16 represent heating means and cooling means, respectively. In the operation of the apparatus, the necessary reagent solutions are withdrawn from two or more of the storage vessels and are continuously introduced into the reaction chamber in the desired proportions. The reaction chamber 13 is preferably of such size that the time of residence therein is relatively short, i. e., less than about one minute and preferably not more than a few seconds. The reaction mixture leaving the reaction chamber is promptly led via conduit 14 through the heating device 15 and then through the cooling device 16.

In order to maintain the composition of the reaction mixture in the reaction chamber as nearly uniform as possible and to avoid undesirable local concentrations of reagents, the reaction mixture in the reaction zone is preferably well agitated. This may be accomplished by means of a small stirring or agitating device (not shown) or by introducing the reagents at relatively high linear velocities into a suitably shaped reaction vessel. The desired linear velocities may be advantageously produced by maintaining a sufficient head of liquid, by pumping, or preferably, by maintaining the reagents in the storage vessels under a gas pressure. In a preferred embodiment of the invention a reaction vessel of a form such as shown in plan and elevation in Figures II and III of the accompanying drawing is advantageously employed. The reaction vessel illustrated in Figures II and III, as is readily seen, comprises a cylindrical or disk-shaped chamber 20 having tangential inlets 21 and 22 and a central outlet 23. In general, two tangential inlets are sufficient; if, however, it is desired to introduce three or more reagents separately into the reaction chamber, any number of additional tangential inlets may be provided. A small reaction chamber of this type affords excellent mixing of the reagents and is capable of producing large quantities of catalyst.

The process of the present invention is preferably employed in the preparation of metal oxide catalysts via precipitation of the corresponding insoluble hydroxides from aqueous solutions. Of the various metal oxides, those of Ti, V, Cr, Mn, Sn, Fe, Co, Ni, Mo, W, Th, and U are often present in the catalyst in relatively large proportions. Many suitable catalysts are, in fact, composed entirely of one or a mixture of such oxides. The oxides of Cu, Zn, Al, Zr, Pb, Sb, Bi, Ru, Rh, Pd, Pt, etc., may be used alone or in admixture with one another, but are more commonly employed in conjunction with one or more of the above mentioned metal oxides. Oxides of such metals as La, Tl, Ce, Nb, Ta, Os, and Ir, may also be combined in minor quantities in the capacities of activators, stabilizers, specific promoters, etc., if desired. The present process is particularly advantageous for the preparation of catalytic oxides of V, Cr, Mn, and Fe, and combination catalysts such, for instance, as those comprising one or more of these oxides in combination with minor amounts of the oxides of Al, Si, B, Zr, Zn, or Ti. Other combination catalysts which may be advantageously prepared, according to the present process, are, for example, catalysts comprising the oxides of Ti and Al, Ni and W, Cr and Fe and Mg, etc.

As described above, the metal hydroxides or mixtures of metal hydroxides are precipitated, according to the process of the present invention, very quickly in small proportions under uniform conditions. In some cases, instead of precipitating the oxide or hydrated oxide of the metal or mixtures of metals from acid solutions by means of a suitable base, it is convenient to precipitate the carbonates and to convert the precipitate to the oxide in a subsequent step. The present process can also be applied in the preparation of certain metallates, such, for instance, as in the preparation of nickel tungstate, by reacting solutions of sodium tungstate and nickel nitrate. The solutions of metal compounds, precipitation reagents, concentrations of reagent solutions and proportions of reagents which may be suitably applied, may vary according to the particular catalyst which it is desired to prepare. These factors do not, in general, differ from conventional practice and are all factors which have been studied and are generally known to those skilled in the art.

The reaction mixture containing the precipitated metal hydroxide or mixture of metal hydroxides is subjected to a very short heat treatment. The optimum duration of the heat treatment depends somewhat upon the temperature of the treament and the particular catalyst in question. Generally speaking, if the reaction mixture is heated only very mildly, for instance, up to about 40° to 50° C., the time of heating may be prolonged in certain cases to as much as about ten minutes. It is preferable, however, to heat the reaction mixture to somewhat higher temperatures, for instance, between 50° C. and the boiling point of the reaction mixture. At these more desirable temperatures the time of heating should rarely exceed about one or two minutes. While heating times as high as one or two minutes and sometimes even as high as about ten minutes may be employed, these represent approximate maximum heating times. The heat treatment which gives the optimum results is, in general, considerably less than one minute. Thus, for example, when preparing the oxides of metals such as Cr, Fe, Al, etc., which precipitate very gelatinous hydroxides, the optimum heat treatment is only about 2 to 10 seconds at about 70° to 100° C.

When the metal hydroxide or mixture of metal hydroxides is precipitated continuously as described above, the heating device 15 is chosen of such size as to afford the optimum heating time at the throughput velocity employed. By using a small heating device heated by steam, hot oil, or the like, the heating time may be easily maintained constant at any desired temperature. Small adjustments in the time of heating may also, of course, be made by regulating the throughput velocity of the reaction mixture.

Since the activity of the catalysts is impaired by longer heating, the reaction mixture issuing from the heating device 15 is preferably promptly passed through a cooling device 16 wherein it is rapidly cooled. In general, the precipitation, heating, and cooling should not require more than about ten minutes in total. The precipitate is preferably promptly separated from the cooled reaction mixture by filtration, centrifuging, or the like, and worked up in the usual manner. In the subsequent working up, the precipitate is usually washed and dried and then sometimes pretreated with hydrogen at an elevated temperature. In certain cases it may be desirable to completely reduce the metal oxide to the metal. Additional substances such as promoter substances, inert fillers, carrier or supporting materials, and the like, if desired, are preferably added to the precipitate after it has been separated and washed.

If it is desired to produce a catalyst containing two or more metal oxides, this may usually be done by co-precipitating the hydroxides. In some cases, however, where the respective metal hydroxides are preferably precipitated under different conditions or with different reagents, the hydroxides may be prepared separately as described and then mixed, preferably before drying.

*Example I*

11,000 cc. of a chromium nitrate solution containing 102.7 grams of $Cr(NO_3)_3$ per 20 liters of water and 11,000 cc. of an ammonium hydroxide solution containing 61.5 cc. of concentrated ammonium hydroxide per 20 liters of water were each fed at a rate of 5 liters per hour into a small reaction chamber (capacity about 2.5 cc.) such as illustrated in Figures II and III of the drawing. The reaction mixture leaving the reaction chamber was rapidly heated to about 97° C. and then rapidly cooled, the heat treatment lasting approximately ten seconds. The cooled reaction product was promptly filtered, washed with 14 liters of water, dried for two hours at 150° C. in an oven, treated for four hours at 350° C. in a current of hydrogen, and pressed into catalyst pellets. Other catalysts containing chromium oxide in combination with other metal oxides were prepared in a similar manner by employing solutions of the nitrates of the respective metals in the desired proportions instead of the chromium nitrate solution. These catalysts were found to be exceptionally suitable for catalyzing hydrocarbon reactions such as the dehydrogenation of paraffin and naphthene hydrocarbons, the reforming and desulfurization of motor fuels and the like. For example, when applied for the cyclization of paraffin hydrocarbons to aromatic hydrocarbons, according to the process described in copending application No. 294,590, filed September 13, 1939, they were found to possess greater catalytic activity and to decline in activity much more slowly than catalysts of the same composition prepared by the conventional methods.

Aside from the superior properties of the catalysts, the present process is also advantageous in that it allows the various catalysts to be produced absolutely uniform in any desired quantities in a most practical and economical manner.

I claim as my invention:

1. In a process for the preparation of a metal oxide catalyst wherein a compound of a metal is precipitated from an aqueous solution and the precipitate is collected and converted into the active oxide catalyst, the steps of effecting the precipitation without heating, subjecting the reaction mixture substantially as soon as the precipitation is complete to a short heat treatment, said heat treatment being not longer than about two minutes at a temperature between about 50° C. and the boiling point of the reaction mixture, and then separating and washing the precipitate.

2. In a process for the preparation of a metal oxide catalyst wherein a compound of a metal is precipitated from an aqueous solution and the precipitate is collected and converted into the active oxide catalyst, the steps of effecting the precipitation without heating by continuously mixing separate streams of the metal salt and precipitant, thereupon subjecting the reaction mixture substantially as soon as the precipitation is complete to a short heat treatment, said heat treatment being not longer than about two minutes at a temperature between about 50° C. and the boiling point of the reaction mixture, and then separating and washing the precipitate.

3. In a process for the preparation of a metal oxide catalyst wherein a compound of a metal is precipitated from an aqueous solution and the precipitate is collected and converted into the active oxide catalyst, the steps of effecting the precipitation without heating by continuously mixing separate streams of the metal salt and precipitant, heating the reaction mixture substantially as soon as precipitation is complete to a temperature between 50° C. and the boiling point of the reaction mixture, cooling the heated reaction mixture, and separating the precipitate, said precipitation, heating and cooling steps being executed in a period of not more than ten minutes.

4. In a process for the production of a catalytically active chromium oxide-containing catalyst wherein hydrous chromium oxide is precipitated from an aqueous solution and the hydrous chromium oxide precipitate is collected and converted into the active oxide catalyst, the steps of effecting the precipitation without heating, subjecting the reaction mixture substantially as soon as the precipitation is complete to a short heat treatment, said heat treatment being not longer than about two minutes at a temperature between about 50° C. and the boiling point of the reaction mixture, and then separating and washing the precipitate.

5. In a process for the production of a mixed metal oxide catalyst wherein compounds of a plurality of metals are co-precipitated in an aqueous solution by a common precipitant and the precipitate is collected and converted into an active mixed oxide catalyst, the steps of effecting the precipitation without heating by continuously mixing separate streams of the metal salt and precipitant, thereupon subjecting the reaction mixture substantially as soon as the precipitation is complete to a short heat treatment, said heat treatment being not longer than about two minutes at a temperature between about 50° C. and the boiling point of the reaction mixture, and then separating and washing the precipitate.

WILLEM FREDERIK ENGEL.